July 19, 1966 V. B. CONES 3,262,011
HEADLAMP FOR BOTH DAY AND NIGHT DRIVING
Filed July 2, 1963
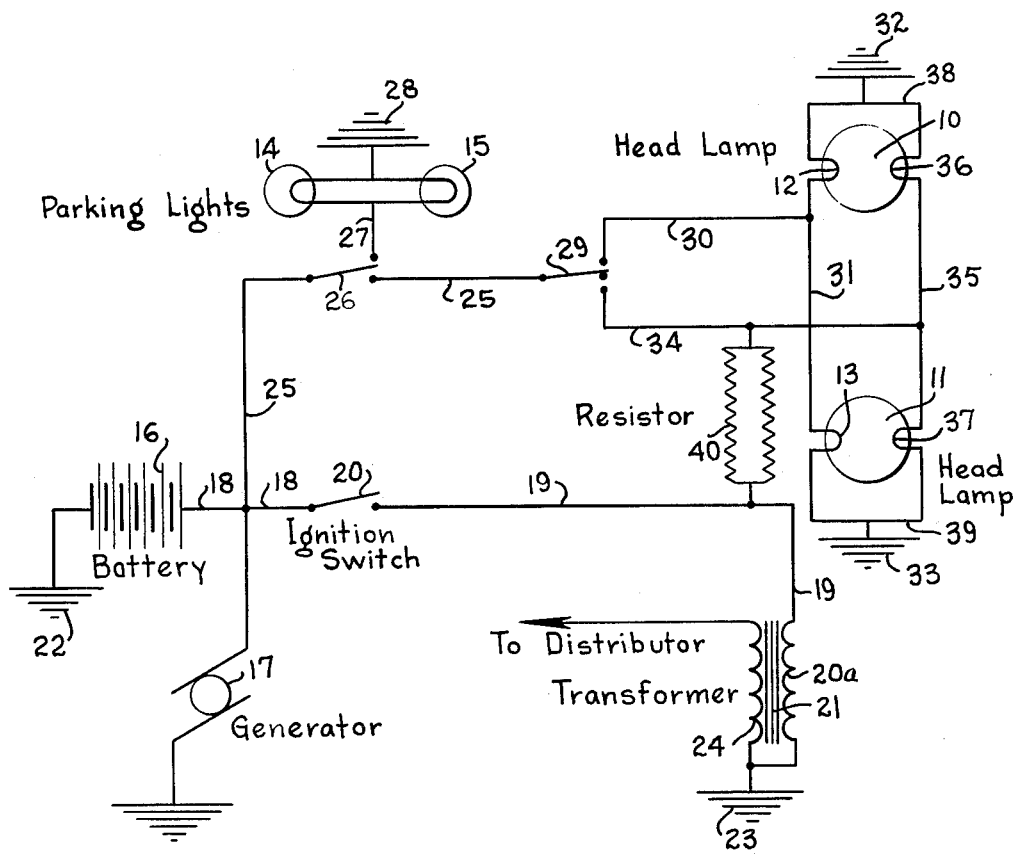
INVENTOR
VAN BUREN CONES
BY Herbert A. Winters
ATTORNEY

United States Patent Office 3,262,011
Patented July 19, 1966

3,262,011
HEADLAMP FOR BOTH DAY AND NIGHT DRIVING
Van Buren Cones, Indianapolis, Ind., assignor of fifty percent to Ben Cones, Indianapolis, Ind.
Filed July 2, 1963, Ser. No. 292,345
2 Claims. (Cl. 315—82)

This invention relates to means for reducing the brilliance of the low beam filament of a headlamp on an automobile upon the closing of an ignition switch.

In many instances during daytime driving of an automobile, the automobile does not stand out clearly to the driver of an approaching car in another lane of a road. Sometimes, this condition is encountered particularly where there is a background of shrubbery, trees, or other factors into which the oncoming automobile seems to blend better. In any event, an oncoming automobile is always more clearly noted if there is some illumination on its forward end to attract the attention of a person traveling towards that oncoming car. There have been attempts made to apply illumination to an automobile, and one of these attempts have been made to mount a single lamp normally in the center of the radiator of the car, and to control this lamp through manipulation of the ignition switch whereby this auxiliary lamp is energized when the ignition switch is closed. This lamp has been of a rather high candle power with a sharp focus which at times may be blinding.

While such a lamp does at times draw atention to the oncoming car simply by reason of the fact that it is not a normally positioned lamp, nevertheless, it does not seem to meet the purpose of making the oncoming driver conscious of the presence of the position of that lamp carrying car simply because there is not a dimensional indication. The single lamp centrally located does cause some confusion at night particularly in trying to determine what width of a vehicle is approaching.

The present invention is conceived to promote furtherance of safety and traffic on our roadways. In place of the single pin-pointed lamp centrally located on the radiator, the present invention contemplates use of the low beam filament of the headlights already installed on the automobile. The invention contemplates that the low beams of these headlights be illuminated only to that degree where there is no blinding effect upon the driver of the oncoming car and whereby the width of the vehicle is indicated by the spacing of part of the low beam filaments in the two lights.

Not only is it a purpose of the present invention to indicate width of the vehicle by using the two low beam filaments, but in order to do so, there is but one simple unit, a resistor, required to be installed and that could be done with little expense. These and other objects of the invention will become apparent to those versed in the art as described in reference to the drawing wherein the single view is a schematic wiring diagram. The normal automobile or car as it will be hereinafter termed is provided with two headlamps 10 and 11. In each of these lamps there is a high beam filament 12 and 13 respectively. Also, the normal car is provided with a pair of so called "parking" lamps 14 and 15, but under the laws of several states, these parking lamps can not be employed under driving conditions and reliance must be placed upon the headlamps 10 and 11.

The source of electrical current is the usual battery 16 maintained by a generator 17. The usual wiring in a car is of the grounded type requiring but one wire 18 leading from the battery. From this wire 18 there leads a wire 19 interrupted by an ignition switch 20, and this wire 19 leads to the primary winding 20a of the ignition coil or transformer 21. The negative side of the battery 16 is grounded as at 22 and likewise the winding 20a is grounded at 23. So much for the ignition system, the secondary winding 24 leading to the distributor in the usual and well known manner.

From the wire 18, there leads a wire 25 to supply the illuminating system. This wire 25 is interrupted by a switch 26 normally maintaining the wire 25 in a closed circuit in so far as the switch is concerned, and the switch being shiftable to cause a circuit from the wire 25 through a wire 27 to the two parking lamps 14 and 15 in parallel, these lamps in turn being grounded as at 28. Wire 25 leads to a control switch 29 which may be shifted to control the high and low beam filaments of the lamps 10 and 11. The switch 29 closes a circuit from the wire 25 through wire 30 to the wire 31 which leads to both of the filaments 12 and 13, the circuit therefrom being completed through either one or both of the grounds 32 and 33. The filaments 12 and 13 may be de-energized and held in that condition by an intermediate position of the switch 29 as indicated in the drawing, or the switch 29 may be further operated to cause a circuit from the wire 25 to the wire 34 which leads to the wire 35 in turn leading to the filaments 36 and 37 which are the low beam filaments of the two lamps. From these filaments 36 and 37 lead the wires 38 and 39 to the grounds 32 and 33 respectively.

So far what has been described constitutes the normal schematic wiring diagram of the usual car.

My invention consists in applying a resistor 40 between the wire 19 and the wire 34 so that when the switch 29 interconnects the wire 25 with the wire 34, the low beam filaments 36 and 37 receive less than the normal voltage due to the leak of current from the wire 19 to the wire 34 when the ignition switch 20 is closed and the switch 29 is in the neutral position. That is, the resistor 40 retards flow of current between the wire 19 and the wire 34 as compared to the flow of current otherwise had in the absence of the resistor 40 and the closure of the switch 29 of the wire 25 with the wire 34.

That is, in daylight driving, when the switch 29 is in the neutral or open position or condition, none of the filaments 12, 13, 36 and 37 are being energized directly. However, when the ignition switch 20 is closed, which would be the condition when the car is being operated, current is supplied to the filaments 36 and 37 by reason of the presence of the resistor 40 which allows a predetermined flow of current depending upon the resistance provided in this element 40.

Under such a condition, the low beam elements 36 and 37 will be sufficiently energized to provide a visible illumination from a distance to indicate the presence of the car and by reason of use of those two filaments spread as they are, give an indication as to the width of the vehicle. The use of the resistor 40 does not interfere with the use of the full illumination of the filaments 36 and 37 for low beam operation as may be required.

Therefore, it is to be seen that by locating the resistor 40 in relation to the beam controlled switch and the ignition control switch and the low beam elements of the headlamps all as indicated by the drawing and by the preceding description, I am able to accomplish a very desirable result in a most simple and yet efficient manner at a very low cost whereby the resistor causes the low beam filaments to provide a reduced illumination. While I have herein shown and described my invention in this one particular form, it is obvious that a change in the diagram may be effected without departing from the spirit of the invention, and accordingly I do not desire to be limited to that precise form described and illustrated beyond the limitations which may be imposed by the following claims.

I claim:
1. In a vehicle having an ignition system, a headlamp having both high and low beam filaments, a source of electrical energy, and circuits between said source, said filaments, and said system, the combination therewith of
   a filament control switch in one of said circuits including said filaments wherein the switch selectively may set up an open circuit condition in respect to said energy source and both of said filaments, a closed circuit condition in respect to the energy source and the high beam filament only, and a closed circuit condition in respect to said source and the low beam filament only;
   an ignition switch in another of said circuits controlling said ignition system and being in the circuit between said source and said system; and
   a resistor interconnecting said low beam filament circuit with said ignition system circuit between said control switch and the low beam filament and between said ignition switch and the ignition system respectively;
   providing energization of the low beam filament only through said resistor when the ignition switch is closed and the filament control switch is in said open circuit condition said resistor causing the low beam filaments to provide a diminished illumination.

2. In a vehicle having a source of electrical energy, a pair of spaced apart headlamps each having a high beam and a low beam filament, an ignition system, and a circuit means between said source and said filaments and said system, the combination therewith of
   a filament control switch in said means controlling flow of said energy to said filaments by selective operation cutting off said flow, setting up flow to the high beam filaments, and setting up flow to said low beam filaments;
   a second switch in said circuit means selectively providing energy flow to said system; and
   a resistor interconnected between said ignition switch and said low beam filaments;
   said resistor providing a flow of energy to the low beam filaments when there is a flow through the ignition switch and there is no flow through the filament switch to the low beam filaments, said resistor causing said low beam filament to provide a diminished illumination.

References Cited by the Examiner

UNITED STATES PATENTS

| | | | |
|---|---|---|---|
| 1,686,859 | 10/1928 | Huntington | 240—7.1 |
| 3,206,723 | 9/1965 | Doane | 315—82 X |

JAMES W. LAWRENCE, *Primary Examiner.*

GEORGE WESTBY, *Examiner.*

S. D. SCHLOSSER, *Assistant Examiner.*